United States Patent
Lorenzetti et al.

(10) Patent No.: US 9,662,863 B2
(45) Date of Patent: May 30, 2017

(54) MULTILAYER BARRIER FILM, A PACKAGING LAMINATE COMPRISING THE FILM, A PACKAGING CONTAINER FORMED FROM THE PACKAGING LAMINATE AND A METHOD FOR THE PRODUCTION OF THE FILM

(71) Applicant: Tetra Laval Holdings & Finance S.A., Pully (CH)

(72) Inventors: Cesare Lorenzetti, Bulle (CH); Lisa Rey, Botterens (CH)

(73) Assignee: Tetra Laval Holdings & Finance S.A., Pully (CH)

( * ) Notice: Subject to any disclaimer, the term of this patent is extended or adjusted under 35 U.S.C. 154(b) by 492 days.

(21) Appl. No.: 14/127,161

(22) PCT Filed: Sep. 27, 2012

(86) PCT No.: PCT/EP2012/068190
§ 371 (c)(1),
(2) Date: Dec. 17, 2013

(87) PCT Pub. No.: WO2013/041469
PCT Pub. Date: Mar. 28, 2013

(65) Prior Publication Data
US 2014/0199505 A1    Jul. 17, 2014

(30) Foreign Application Priority Data
Sep. 20, 2011 (SE) .................................. 1150855

(51) Int. Cl.
*B32B 27/08* (2006.01)
*B32B 27/10* (2006.01)
(Continued)

(52) U.S. Cl.
CPC .......... *B32B 27/08* (2013.01); *B29C 47/0057* (2013.01); *B29C 47/06* (2013.01);
(Continued)

(58) Field of Classification Search
CPC ......... B32B 27/08; B32B 27/10; B32B 27/32; B32B 7/12; B32B 27/306; B32B 27/327;
(Continued)

(56) References Cited

U.S. PATENT DOCUMENTS 5,153,074 A    10/1992  Migliorini
6,472,081 B1   10/2002  Tsai et al.
(Continued)

FOREIGN PATENT DOCUMENTS

CH        97471       1/1923
CN     101448639      6/2009
(Continued)

OTHER PUBLICATIONS

English translation of Notification of the First Office Action issued by the State Intellectual Property Office of P.R.C. on Dec. 6, 2015, in counterpart Chinese Patent Application No. 201280030671.1.
(Continued)

*Primary Examiner* — Michael C Miggins
(74) *Attorney, Agent, or Firm* — Finnegan, Henderson, Farabow, Garrett & Dunner LLP

(57) ABSTRACT

The invention relates to a biaxially oriented multilayer, barrier polymer film, having gas barrier properties and consisting of polymer layers, comprising a polyolefin core layer and a barrier surface layer of ethylene vinyl alcohol (EVOH) on a first side of the core layer. The invention further relates to such a vapor deposition coated film, especially a metallized such film. The invention also relates to a packaging laminate comprising the film or vapor deposition coated polymer film and to a packaging container
(Continued)

produced from such a packaging laminate. The invention further relates to a method for the production of the barrier film.

31 Claims, 4 Drawing Sheets

(51) Int. Cl.
  *B32B 27/32* (2006.01)
  *B32B 7/12* (2006.01)
  *B32B 27/30* (2006.01)
  *B29C 47/00* (2006.01)
  *B29C 47/06* (2006.01)
  *B32B 1/02* (2006.01)
  *B32B 7/02* (2006.01)

(52) U.S. Cl.
  CPC ............... *B32B 1/02* (2013.01); *B32B 7/02* (2013.01); *B32B 7/12* (2013.01); *B32B 27/10* (2013.01); *B32B 27/306* (2013.01); *B32B 27/32* (2013.01); *B32B 27/327* (2013.01); B32B 2250/05 (2013.01); B32B 2250/246 (2013.01); B32B 2255/10 (2013.01); B32B 2255/205 (2013.01); B32B 2270/00 (2013.01); B32B 2307/31 (2013.01); B32B 2307/518 (2013.01); B32B 2307/54 (2013.01); B32B 2307/7244 (2013.01); B32B 2307/7246 (2013.01); B32B 2439/62 (2013.01); B32B 2439/70 (2013.01); Y10T 428/1303 (2015.01); Y10T 428/24975 (2015.01); Y10T 428/264 (2015.01); Y10T 428/265 (2015.01)

(58) Field of Classification Search
  CPC .......... B32B 2250/05; B32B 2250/246; B32B 2255/10; B32B 2255/205; B32B 2270/00; B32B 2307/31; B32B 2307/518; B32B 2307/54; B32B 2307/7244; B32B 2307/7246; B32B 2439/62; B32B 2439/70; B32B 1/02; B32B 7/02; Y10T 428/266; Y10T 428/1303; Y10T 428/24975; Y10T 428/264; B29C 47/0057; B29C 47/06
  See application file for complete search history.

(56) References Cited

U.S. PATENT DOCUMENTS

| 2009/0053513 A1 | 2/2009 | Enzinger et al. |
| 2009/0208717 A1 | 8/2009 | Enzinger et al. |
| 2009/0311524 A1 | 12/2009 | Noma et al. |

FOREIGN PATENT DOCUMENTS

| EP | 0541273 | 5/1993 |
| WO | WO2006/117034 | 11/2006 |
| WO | WO2006/128589 | 12/2006 |

OTHER PUBLICATIONS

International Search Report issued by the EPO in corresponding International Application No. PCT/EP2012/068190, dated Feb. 11, 2012 (2 pages).

MULTILAYER BARRIER FILM, A PACKAGING LAMINATE COMPRISING THE FILM, A PACKAGING CONTAINER FORMED FROM THE PACKAGING LAMINATE AND A METHOD FOR THE PRODUCTION OF THE FILM

CROSS-REFERENCE TO RELATED APPLICATIONS

This is a U.S. National Phase Application of International Application No. PCT/EP2012/068190, filed Sep. 17, 2012, which claims the benefit of priority to Swedish Patent Application No. 1150855-3, filed Sep. 20, 2011, which is incorporated herein by reference.

TECHNICAL FIELD OF THE INVENTION

The present invention relates to a biaxially oriented, multilayer polymer barrier film, having gas barrier properties and consisting of polymer layers only, comprising a polyolefin core layer and a barrier surface layer of ethylene vinyl alcohol (EVOH) on a first side of the core layer. The invention also relates to such a substrate film being further coated with a barrier material, in particular with a vapour deposited barrier coating. The invention further relates to a laminated packaging material comprising the biaxially oriented, polymer barrier film or the further barrier coated such film, and to a packaging container produced from such a laminated packaging material. The invention further relates to a method for the production of the biaxially oriented, multilayer polymer, barrier film and such further barrier coated films.

BACKGROUND OF THE INVENTION

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, marketed and sold for long term ambient storage. The packaging material in this known packaging container is typically a laminate comprising a bulk layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional such gas barrier layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable adhesive polymers and/or polyolefins. Also on the outside of the paper or paperboard bulk layer, there is an outermost heat sealable polymer layer. The heat-sealable polymer layers are preferably based on low density polyethylenes.

The packaging containers are generally produced by means of modern, high-speed packaging machines of the type that continuously form, fill and seal packages from a web or from prefabricated blanks of packaging material, e.g. Tetra Brik Aseptic®-type packaging machines. Packaging containers may thus be produced by the so-called form-fill-seal technology basically including reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the filled contents in the tube. The packages are separated from the tube by incisions along the transversal seals and are given the desired geometric configuration, normally parallelepipedic, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean circumstances such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

A layer of an aluminium foil in the packaging laminate provides barrier properties quite superior to most polymeric barrier materials. The conventional aluminium-foil based packaging laminate for liquid food aseptic packaging is the most cost-efficient packaging material, at its level of performance, available on the market today. Any other material to compete must be more cost-efficient regarding raw materials, have comparable food preserving properties and have a comparably low complexity in the conversion into a finished packaging laminate.

Hitherto, there are hardly any aseptic paper- or paperboard-based packages for long-term ambient storage of the above described kind available on the market, from a cost-efficient, non-foil packaging laminate, as compared to aluminium-foil laminates, that have a reliable level of barrier properties (e.g. oxygen barrier, water vapour barrier etc) and food preservation properties for long term storage, such as for example more than 3 months.

Among the efforts of developing more cost-efficient packaging materials and minimizing the amount of raw material needed for the manufacturing of packaging materials, there is a general incentive towards developing pre-manufactured films having multiple barrier functionalities, which may replace or complement the aluminium-foil. Previously known such examples are films combining multiple layers, which each contribute with complementing barrier properties to the final film, such as for example films having both a vapour deposited barrier layer and a further polymer-based barrier layer coated onto the same substrate film. Such films, which have been coated at least two times with different coating methods, tend, however, to become very expensive and involve very high demands on the qualities of the substrate film, such as thermal resistance and handling durability.

On the other hand, in order to optimise the packaging laminate, the production of it, and of packaging containers manufactured therefrom, there is an incentive, in addition to lowering the raw material costs, to simplify the structure of the packaging laminate, to decrease the number of conversion steps needed and to provide a packaging laminate that has sufficient barrier and food preserving properties.

Many so-called barrier films are provided commercially today. A common denominator for most such films is that they often are too expensive, since they require comparatively thick layers, alternatively or additionally several layers, of precious barrier materials and/or are not good enough in terms of the barrier properties and mechanical properties required for incorporation into a carton packaging laminate, from which fold formed, sterilised, filled and sealed packages (form-fill-seal) are to be produced. For example, a single layer barrier layer of a barrier polymer such as ethylene vinyl alcohol (EVOH) or polyamide for the purpose of high barrier properties, is far too expensive.

One type of such barrier films are so-called high surface energy films (HSE) for subsequent further barrier coating with ceramic, organic or metallic vapour deposition coatings, such as SiOx coatings or metallisation coatings. The high surface energy of the film, mostly based on polypropylene or similar polyolefin films, is provided by a thin surface layer of e.g. polyamide or ethylene vinyl alcohol.

In EP-B-541273, first filed in 1991, there is described a barrier film wherein an aqueous coating dispersion comprising polyvinylalcohol and an adhesion promoting, co-polymer or modified polymer, is coated onto a polypropylene substrate film, which has been oriented in a first direction. After the coating and drying operation of the PVOH-based coating, the film is subsequently oriented in the second direction, in order to produce a biaxially oriented film, having a surface suitable for subsequent further metallisation onto the PVOH-based surface. The costs of such a film are, however, very high, since they involve two coating steps of different kinds, first a wet dispersion coating with subsequent drying, and there after a further vapour deposition coating operation, with an orientation operation between these two coating operations. There is hardly any, or no, economic advantage of including such a film into a laminated material for disposable packaging containers.

In U.S. Pat. No. 5,153,074 (first filed in 1991), a film for metallisation having a high energy surface of EVOH is described. The base layer of polypropylene is coextruded together with the EVOH surface layer with a bonding layer of a maleic acid anhydride modified polypropylene homopolymer in between the two layers. According to the only Example, the thus obtained film is then sequentially oriented, first three times its original length in the machine direction and then 8 times in the transversal direction. The EVOH employed in the Example had an ethylene mole percentage of 48. The final film total thickness was 80-100 gauge units, while the thickness of the EVOH layer was only 3 gauge units. According to the measurements on the metallised film of the Example, the oxygen transmission was from 2.6 to 5.4 $cm^3/m^2/day/atm$ at 0% RH and 23° C.

Obviously, the very thin layer of EVOH in this film serves only as a metal-receiving layer and not actually as an oxygen barrier layer. Especially, since the EVOH employed has a high content of ethylene monomer units, thus having rather low inherent gas barrier properties.

In tests by applicants of the present invention, high-surface energy uncoated substrate films, such as described in U.S. Pat. No. 5,153,074, provide oxygen transmission rates as high as from 70 to 110 $cm^3/m^2/day/atm$ at 23° C. 50% RH.

In US-A-2009/0053513 (corresponding to WO2006/117034, first filed in 2005), a similar (to U.S. Pat. No. 5,153,074) BOPP-based film having a high surface energy layer of polyamide, for subsequent coating with SiOx, AlOx or a metallised coating, is described to provide surprisingly improved oxygen barrier properties in its barrier coated state, compared to the previous structures. The improvement is explained to be related to the method of simultaneous biaxial orientation (LISIM®), wherein the stretching of the polymer film is carried out simultaneously in the MD and TD to at least a stretching ratio of above 6-7 times the original length and width of the film material. The oxygen transmission values obtained by such a further barrier coated film is claimed to be lower than 0.20 to 0.50 $cm^3/m^2/day/atm$ at 23° C. 75% RH. Also in this case, however, the oxygen barrier obtained is related to the subsequent barrier coating, rather than to the HSE-type substrate film itself.

It is generally known that films from EVOH copolymers are difficult to orient and stretch. It is believed that this is due to the large number of hydroxyl groups in the molecules of EVOH, which easily form hydrogen bonds during formation of the non-oriented film.

In US-A-2009/0208717 (corresponding to WO2006/128589, first filed in 2005), the method of simultaneous biaxial orientation (LISIM®) is used to stretch films with symmetrical configuration and internal EVOH gas barrier layers. Here, a clear improvement of the EVOH layer barrier properties is seen. The EVOH barrier properties were increased two-fold (doubled) compared to similar non-oriented films having the same layers and layer thicknesses. Also by this publication, it is taught that by sequential biaxial orientation of similar films, the ethylene content of the EVOH polymer must be higher than 45 mole-%, and that also simultaneous biaxial orientation of films with internal EVOH layers having a lower ethylene content than 40 mole-% was earlier considered impossible. According to the invention as described in US-A-2009/0208717, however, simultaneous biaxial orientation of a film having a central EVOH layer was found possible, also at ethylene contents below 40 mole-%, conditional certain temperature and stretching conditions. US-A-2009/0208717 discloses that it is possible to simultaneously stretch a film of the general structure B/C/D/C/B, where the two B layers are based on polypropylene homopolymers, the two C layers are polypropylene or polyethylene modified by maleic anhydride, and layer D is the above specified central EVOH layer. The thickness of the EVOH layer should generally be from 1 to 10 μm, preferably from 1 to 6 μm. Furthermore, it is well known, and also taught by US-A-2009/0208717, that EVOH layers should be protected from the environment as their barrier properties are impaired on ingress of atmospheric moisture. Thus, the EVOH layers are arranged in the core of a multi-layer film (B/C/D/C/B). Moreover, it is taught by US-A-2009/0208717 that also film blowing methods such as so-called "Bubble" or Double-bubble" methods are included in the range of simultaneous orientation methods.

OBJECT OF THE INVENTION

It is an objective of the present invention to provide a cost-efficient polyolefin-based film having good gas barrier properties and mechanical properties, being suitable for further coating with barrier material layers, and suitable for use in a packaging laminate and in carton-based liquid packaging containers manufactured therefrom, which film alleviates the above discussed disadvantages and problems and which fulfils at least some of the above requirements, preferably all of them.

In particular, it is an objective of the present invention to provide a cost-efficient polymer film having improved gas barrier properties, also at high humidity conditions.

It is a further object to provide a vapour deposition coated barrier film, based on the improved polymer film as the coating substrate, having improved gas barrier properties at high humidity as well as at straining of the film.

According to a further aspect of the invention, an improved packaging laminate is provided, which may be folded and re-shaped into a packaging container, with maintained gas barrier properties. Accordingly, also improved packaging containers are provided, manufactured from the packaging laminate, which have improved gas barrier properties, also at long term storage and at high humidity conditions.

It is a further object of the invention to provide a packaging laminate comprising the polymer barrier film, which also has good mechanical properties, including toughness and bending stiffness, to be suitable for continuous, high speed aseptic packaging of liquid foods by means of continuous tube-forming, when laminated into a paper- or paperboard-based packaging material web.

The invention is further directed to a packaging container filled with solid, semi-solid or liquid food or beverage and produced from a packaging laminate comprising the barrier film.

These and other objectives are achieved by means of the biaxially oriented, multilayer polymer barrier film, the barrier film coated with a further barrier material layer, the packaging laminate and the packaging container comprising said film or coated film, and by the method for the production of the biaxially oriented, multilayer polymer barrier film according to the invention, as defined in the appended claims and as described herein.

It is to be understood hereinafter that the thicknesses given for the various layers of the multilayer film are the thicknesses obtained after stretching for orientation of the intermediate, laminated, multilayer film.

Accordingly, the present invention provides a biaxially oriented, multilayer polymer barrier film (10a), having gas barrier properties and comprising a polyolefin core layer and at least one barrier surface layer of ethylene vinyl alcohol (EVOH) on at least one side of the core layer, the barrier layer of EVOH being less than 1.5 µm thick and having an ethylene content of 36 mole-% or lower; and the film having an oxygen transmission (OTR) lower than 10 cm$^3$/m$^2$/1 day/1 atm, 24 h, 23° C., 50% RH.

According to an embodiment of the invention, the OTR of the polymer barrier film is lower than 5 cm$^3$/m$^2$/1 day/1 atm, 24 h, 23° C., 50% RH, such as for example, when the thickness of the EVOH barrier surface layer is about 0.6 µm, and the ethylene content of the EVOH is 32 mole-%. The OTR measured at 90% RH is then lower than 25 cm$^3$/m$^2$/1 day/1 atm, 24 h, 23° C., or lower.

According to one embodiment of the invention the OTR is lower than 1 cm$^3$/m$^2$/1 day/1 atm, 24 h, 23° C., 50% RH, such as for example, when the thickness of the EVOH barrier surface layer is about 0.6 µm, and the ethylene content of the EVOH is 27 mole-%. The OTR measured at 90% RH is then lower than 25 cm$^3$/m$^2$/1 day/1 atm, 24 h, 23° C., in particular 22 cm$^3$/m$^2$/1 day/1 atm, 24 h, 23° C. or lower.

According to an embodiment of the invention, the polyolefin core layer comprises a biaxially oriented polyolefin selected from the group consisting of polypropylene homopolymers, propylene-ethylene copolymers, propylene copolymers with other alpha-olefins, including propylene-ethylene-butylene ter-polymers, polyethylene homo- and copolymers having a density higher than 0.930, preferably higher than 0.940 (as determined according to ISO 1183 D using compressed samples), including such LLDPE, MDPE and HDPE polymers, and blends of two or more of said polyolefins.

The EVOH suitable for the, biaxially oriented barrier surface layer thus has an ethylene content of 36 mole-% or lower. Above 36 mole-% an improvement of the gas barrier properties of the EVOH layer is hardly obtained. Generally, the lower the ethylene content, the higher barrier improvement will be obtained by means of the simultaneous orientation of the layer. Preferably, the EVOH copolymers further have a degree of hydrolysis of at least 96%, more preferably of 98 to 99%, and the melting point of suitable EVOH copolymers for simultaneous orientation is generally above 150° C. Barrier surface layer is intended to mean that the barrier surface layer of ethylene vinyl alcohol (EVOH) should be an outer or external surface of the base film. The base film may be provided with a coating, which would then be applied on the free surface of the barrier surface layer of EVOH (which thus have one surface towards the polyolefin core layer and one surface towards the coating). Said coating being a deposition coating, such as a vapour deposition coating, e.g. a chemical vapour deposition coating, a physical vapour deposition coating.

According to an embodiment of the invention, the thickness of the EVOH layer is from 0.4 to 1.0 µm, more preferably from 0.5 to 0.7 µm. The thickness of the EVOH should be lower than 1.5 µm. At resulting thicknesses above 1.5 µm, the cost for the low ethylene grade EVOH becomes very high, while a thickness at 1 µm or lower is economically more feasible for the purpose of packaging. Thicknesses below 0.4 µm on the other hand, cannot guarantee an even EVOH layer and thereby even and reliable gas barrier properties throughout the film.

According to a preferred embodiment of the invention, the ethylene content of the EVOH barrier surface layer is 32 mole-% or lower, preferably 27 mole-% or lower. In general, the lower the ethylene content, the higher barrier improvement will be obtained by means of the simultaneous orientation of the layer.

According to an embodiment of the invention, the total thickness of the film is up to 20 µm, preferably from 12 to 18 µm. At above 20 µm total thickness, the cost-efficiency in terms of raw materials decrease, while at below 8 µm, the mechanical properties of the film may be considerably reduced and will not contribute much to the mechanical properties of the packaging laminate.

According to an embodiment of the invention the film further comprises a biaxially oriented tie layer of a modified polyolefin, such as those marketed under the tradename Admer and Bynel or blends of the same, between the polyolefin core layer and the EVOH barrier surface layer. The tie layer is thus binding the polyolefin core layer and the barrier surface layer to each other. A well-functioning example of a suitable such modified polyolefin is maleic anhydride-grafted polypropylene (MAH-PP). The binding layer becomes oriented biaxially in the same directions and to the same extent as the rest of the oriented film. Said binding layer may alternatively consist of a polymer based on polyethylene which is modified by graft- or copolymerisation. The binding layer may suitably have a thickness of from 0.5 to 2 µm.

Further examples of modified polyolefins for the binding layers are polyolefin-based copolymers or graft copolymers with monomers comprising carboxylic or glycidyl or other epoxy-functional groups, such as acrylic monomers or maleic anhydride (MAH) monomers, for example ethylene acrylic acid copolymer (EAA) or ethylene methacrylic acid copolymer (EMAA), ethylene-glycidyl(meth)acrylate copolymer (EG(M)A) or MAH-grafted polyethylene (MAH-g-PE).

According to a preferred embodiment of the invention, the film is oriented to a ratio of from 5 to 8 in the machine direction, MD, and to a ratio of from 5 to 8 in the transversal direction, TD.

The effect of increased gas barrier properties of the EVOH layer is seen particularly at higher stretching ratios, and preferably at a stretching ratio of from 5 to 8 in each direction, by simultaneous orientation in the machine and transversal directions. The effect is lower or absent at lower stretching ratios such as 4 or lower in each direction. On the other hand, at stretch ratios above 8, problems in terms of breaks and tears in the EVOH layer appear, and the gas barrier properties of the material layer deteriorate.

According to the present invention the oxygen transmission rate for the biaxially oriented, multilayered polymer barrier films of the invention should be less than about 10 $cm^3/m^2/1$ day/1 atm, 24 h, 23° C., 50% RH, such as lower than 5 $cm^3/m^2/1$ day/1 atm, 24 h, 23° C., 50% RH, such as lower than 1 $cm^3/m^2/1$ day/1 atm, 24 h, 23° C., 50% RH.

According to a further embodiment of the invention, the film has a second barrier surface layer of EVOH also on the other, opposite, side of the polyolefin core layer. The second barrier layer of EVOH is preferably also less than 1.5 μm thick and has an ethylene content of 36 mole-% or lower.

According to a further aspect of the invention, the polymer barrier film is further coated with a barrier material onto the external surface of the EVOH barrier layer. Thus, the film having a EVOH barrier surface layer as obtained according to the invention may be used as it is alone, or in combination with further barrier material layers, coated onto the film then being used as a substrate film, or laminated to the film into a laminated material. In cases when the film has one EVOH barrier surface layer on each side, both sides of the film can of course be further coated by a barrier material.

Examples of such further barrier material layers are extrusion-coated polymer layers or polymer layers applied subsequently by coating of a dispersion of a polymer. Examples of such polymer layers are polyamides or polyvinylalcohol or other melt extrusion-coatable or dispersion-coatable polymers, respectively. Since the substrate in itself owns good barrier properties, the finally obtained barrier film or laminate will naturally obtain even further increased barrier properties.

Other examples of further barrier material layers are obtained by vapour deposition coating onto the external (free) surface of the EVOH barrier layer. Specific examples of such further vapour deposited barrier material layers are layers of thin metal or metal oxide, especially metallised layers, preferably, a layer of vapour deposited aluminium or aluminium oxide, or DLC coatings. Such vapour deposited layers or metallised layers are brittle and non-elastic in nature, and will normally crack as the flexible polymer substrate film is strained and elongated due to the elastic properties of the substrate film. Consequently, a film according to the invention, which is coated by a vapour deposited barrier layer, has considerably improved gas barrier properties in particular when at strain (i.e. elongation of the film higher than 5%), in use as film wrapping or for fold-forming into packages, compared to other vapour deposited films having no significant gas barrier properties of the substrate film itself. At strain up to about 15% (in terms of elongation of the film), the oxygen transmission (OTR) of a vapour deposition coated film of the invention does not deteriorate to a significant extent compared to not strained film. In comparison, commercial vapour deposition coated films of the prior art show significant OTR increase already at 3% strain.

Preferably, the metallised layer has an optical density (OD) of from 2.0 to 3.0, preferably from 2.2 to 2.9. At an optical density lower than 2.0, the barrier properties of the metallised film are very low. At above 3.0, on the other hand, the metallisation layer becomes too brittle, and the thermostability during the metallisation process will be too low due to higher heat load when metallising the substrate film during a longer time. The coating quality and adhesion will then be clearly negatively affected. An optimum has, thus, been found between these values, preferably between 2.2 and 2.9.

Generally, the vapour deposition coating of a barrier layer onto a polymer substrate film, is carried out by means of a continuous method of physical or chemical vapour deposition. Various coatings of ceramic or metal composition may be applied by this type of methods. Generally, the thickness of such vapour deposited coatings may vary between 5 and 200 nm. Below 5 nm the barrier properties may be too low to be useful and above 200 nm, the coating is less flexible and, thus, more prone to cracking when applied onto a flexible substrate.

A metallisation layer, or ceramic layer, consisting of a thin coating comprising a metal or metal oxide, is preferably applied by means of vacuum deposition, but may less preferably be applied also by other methods generally known in the art having a lower productivity, such as electroplating or sputtering. A preferred metal according to the present invention is aluminium, although any other metal capable of being vacuum deposited, electroplated or sputtered may be used according to the invention. Thus, less preferred and less common metals such as Au, Ag, Cr, Zn, Ti or Cu are conceivable also. Generally, thin coatings of pure metal or a mixture of metal and metal oxide provide barrier properties against water vapour and are used when the desired function is to prevent water vapour from migrating into and through the multilayer film or packaging laminate. However, also gas barrier properties are achieved. Most preferably, the metal in a metallisation coating is aluminium (Al).

Preferred examples of ceramic coatings suitable as functional coatings according to the invention are SiOx coatings also containing carbon in their formula and AlOx coatings, MgOx coatings also being conceivable. This type of coatings provide gas barrier properties to the coated multilayer film as well as some degree of water vapour barrier properties, and are transparent coatings, which may be preferred in some cases.

One preferred coating is a coating of aluminium oxide having the formula $AlO_x$ wherein x varies from 1.0 to 1.5 times Al, preferably of $Al_2O_3$. The thickness of such a coating is from 5 to 100 nm, preferably from 5 to 30 nm.

Preferably, these ceramic coatings are applied by means of physical vapour deposition (PVD) or reactive evaporation deposition or by plasma enhanced chemical vapour deposition method (PECVD), wherein metal or silicon vapour is deposited onto the substrate under oxidising circumstances, thus forming an amorphous metal oxide or silicon oxide layer.

Other preferred silicon oxide-based coatings, are $SiO_xC_y$ and $SiO_xC_yN_z$ coatings. Such coatings often provide good gas barrier properties, and in some cases also water vapour barrier properties.

According to a further aspect of the invention, a laminated packaging material is provided, including the biaxially oriented polymer film of the invention.

In particular, such a laminated packaging material further comprising a paper or paperboard bulk layer is provided. The paper or paperboard bulk layer is arranged to provide for the greatest contribution to the flexural rigidity of the laminate.

It is however also conceivable that the bulk layer of the packaging laminate instead is a polyolefin bulk layer, made e.g. of polyethylene, polypropylene or copolymers of ethylene or propylene, such as, for example, ethylene-propylene, ethylene-butene, ethylene-hexene, ethylene-alkyl (meth)-acrylate or ethylene-vinyl acetate copolymers. The choice of the material for such a polyolefin bulk layer may provide for a transparent packaging laminate, to be used e.g. in a transparent pouch for food.

Laminated packaging materials are obtained by various methods for laminating layers together, such as extrusion lamination, dry adhesive lamination, heat-pressure lamination, and may also be including various coating methods. As described above, the gas barrier of such a packaging material is improved, at fold-forming and re-shaping into packaging containers, due to the flexible gas barrier layer provided already in the polymer substrate film, although the vapour deposited barrier layer may exhibit cracking at strain of the material, and thereby allow for gas permeation at increased rates.

Consequently, an improved packaging container as regards gas barrier properties is provided, when formed from the packaging laminate of the invention, compared to similar packaging containers made from laminates including vapour deposited films, which films however do not include such flexible gas barrier layers.

A packaging container formed from the packaging laminate according to the invention may be of any known shape. Preferably, it is a substantially brick- or wedge-shaped container that is durable at handling and distribution and resistant to moisture and oxygen gas during long term storage, due to the high quality packaging laminate, which in turn also provides for high seal quality and excellent gas barrier properties. A further important advantage of packaging containers produced from the packaging laminate according to the invention is that they may be durable to microwave cooking or thawing. Alternatively, a packaging container may be of the type pillow-shaped fiber pouch such as the packaging container known under the trademark Tetra Fino®. A further type of paperboard-based packages for liquid packaging are the so called Tetra Brik® Edge, Tetra Top® and Tetra Evero® packages or other kinds of bottle-like packages comprising a sleeve of the paperboard-based packaging laminate, a fold-formed bottom thereof, and a top and screw cap of a plastic mould-shaped material.

Accordingly the present invention additionally relates to a packaging container formed by form folding a packaging laminate comprising a biaxially oriented film of the invention.

According to the present invention the oxygen permeation rate for a Tetra Brik® Aseptic (standard volume of 1 liter) package should be below 0.1 cc/package*0.21 atm*24 h such as less than 0.04 cc/package*0.21 atm*24 h, such as less than 0.03 cc/package*0.21 atm*24 h.

According to the present invention, and in particular in connection with the polymer barrier films according to the invention, whenever OTR measurements are referred to the films have a total thickness about 12 µm. Additionally the surface barrier layer is about 0.6 µm.

According to a further aspect of the invention, a method for manufacturing of a biaxially oriented, multilayer polymer film, having gas barrier properties is provided, wherein the method comprises the steps of co-extruding a polyolefin core layer together with a flexible surface barrier layer of ethylene vinyl alcohol (EVOH) on a first side of the core layer, the barrier surface layer having an ethylene content of at most 36 mole-%, simultaneously, biaxially orienting the co-extruded film to a stretching ratio higher than 4 axially in the machine direction (MD) as well as to a stretching ratio higher than 4 in the transversal direction (TD), while maintaining the temperature of the film during the stretching operation between a minimum level and the melt temperature of the polyolefin material of the core layer, which minimum level is depending on the core layer polyolefin material of the film and is at least 105° Celcius.

According to a preferred embodiment of the invention, the stretching ratio is from 5 to 8, more preferably from 6 to 8 in the machine direction (MD) and from 5 to 8, more preferably from 6 to 8 in the transversal direction (TD). In general, the higher the stretch ratio of the EVOH barrier surface layer, at the high stretching rates of simultaneous orientation methods, the higher the degree of crystallinity and improvement of the gas barrier properties thereof. Such stretching ratios, above 4 in both directions, are today only achievable by means of tenter-frame type stretching methods. Any simultaneous stretching by means of the common film blowing methods (Bubble, Double-bubble, Tripple-bubble methods) are thus practically excluded.

According to one embodiment of the method of the invention, a modified polyolefin tie layer is coextruded together with and between the polyolefin core layer and the EVOH barrier surface layer. By co-extrusion of the layers together, the materials are heat fused together from the molten state and will adhere to each other, as well as the inherent properties of the material permit. The modifying functional groups, such as preferably maleic anhydride groups, help to compatibilise the otherwise less compatible polymers of EVOH and PP.

According to one embodiment of the method of the invention, the polyolefin core layer of the film comprises mainly a polypropylene homo- or co-polymer and the temperature of the film during the stretching operation is from 135° C. to below 165° C. With mainly comprising is meant that from 70 to 100 weight-% of the polyolefin is a propylene polymer.

According to one embodiment of the method of the invention, the polyolefin core layer of the film comprises mainly a polyethylene homo- or co-polymer having a density higher than 0.930, the temperature of the film during the stretching operation is from 110° C. to below 135° C. With mainly comprising is meant that from 70 to 100 weight-% of the polyolefin is an ethylene polymer.

According to a preferred embodiment of the method of the invention, the stretching rate at simultaneous stretching of the multilayer polymer film is higher than 200% per second, or preferably higher than 300% per second, such as is normally the case in tenter-frame type simultaneous stretching processes.

According to a further embodiment of the invention, the film further comprises a lamination layer on the side of the polyolefin core layer which is opposite to the EVOH barrier surface layer. The lamination layer preferably mainly comprises a heat sealable polyolefin composition selected from the group consisting of ethylene homo-polymers or ethylene co-polymers with propylene monomers or blends of two or more such polymers, the polyolefin composition having a density higher than 0.930, preferably higher than 0.940.

With mainly comprising is meant that from 70 to 100 weight-% of the polyolefin is an ethylene polymer.

According to a further embodiment of the method of the invention, it further comprises the step of coating the EVOH barrier surface layer (as described above) with a further barrier coating, preferably a vapour deposition coating. The EVOH barrier surface layer is provided such that it can receive a vapour deposition coating, for example a metallised coating or DLC coating. One advantage of this surface is that is not necessary to treat the EVOH barrier surface layer prior to vacuum deposition by metallisation because it inherently has adequate wetting tension. EVOH surface layer is polar and results in adhesion to the substrate without the use of a surface treatment. Thus the EVOH has the appropriate surface energy to obtain a vapour deposition coating.

Accordingly the present invention additionally relates to a coated, biaxially oriented film comprising a biaxially oriented polymer barrier film according to any one of the preceding claims having a deposition coating on the barrier surface layer of EVOH, said coated biaxially oriented film having a thickness of 5-30 µm, such as 7-20 µm, such as 8-15 µm and an oxygen transmission (OTR) lower than 0.1, such as lower than 0.09, such as lower than 0.05 $cm^3/m^2/1$ day/1 atm, 24 h, 23° C., 50% RH.

A vapour deposition coating is applied by means of physical vapour deposition (PVD) or chemical vapour deposition (CVD) onto a polymer substrate film, for example plasma enhanced chemical vapour deposition (PECVD).

The vapour deposition coating is a vapour deposited layers normally being rather thin and according to the invention are nanometer-thick, i.e. they have a thickness that is most suitably counted in nanometers, for example of from 5 to 500 nm (50 to 5000 Å), preferably from 5 to 200 nm, more preferably from 5 to 100 nm and most preferably from 5 to 50 nm.

Generally, below 5 nm the barrier properties may be too low to be useful and above 200 nm, the coating is less flexible and, thus, more prone to cracking when applied onto a flexible substrate.

Vapour deposition coatings useful in the present invention and having barrier properties are typically made of a metal oxide or an inorganic oxide. An example of a suitable method is disclosed in CH97471 where specific details are given in the exemplary part of the description. There are also organic vapour deposited barrier coatings, such as carbon-based vapour deposition coatings, e.g. amorphous carbon layers or so-called diamond-like carbon coatings (DLC). DLC may be advantageous applied on a multilayer polymer barrier film of the invention. Such DLC coated multilayer polymer barrier films can suitably be used for packaging laminates and packaging containers according to the invention. Similarly the metal or inorganic metal vapour deposition coatings can be applied on the multilayer polymer barrier film of the present invention and used for example in packaging laminates and packaging containers according to the invention. The above packaging laminates and packaging containers are suitably for food storage such as liquid food.

In one embodiment of the present invention the vapour deposited layer substantially consists of aluminium metal. Such a metallic thin vapour deposited layer preferably has a thickness of from 5 to 50 nm, more preferably from 5-30 nm, which corresponds to less than 1% of the aluminium metal material present in an aluminium foil of conventional thickness, i.e. 6.3 µm.

In some cases, a step of surface treatment of the substrate film (multilayer polymer barrier film) may be carried out before vapour deposition coating, especially before metallising, the substrate film, in order to secure sufficient adhesion of the coating to the substrate film.

Preferably, the metallised layer has an optical density (OD) of from 1.8 to 3.0, preferably from 2.0 to 2.7. At an optical density lower than 1.8, the barrier properties of the metallised film may be too low. At above 3.0, on the other hand, the metallisation layer becomes brittle, and the thermostability during the metallisation process will be too low due to higher heat load when metallising the substrate film during a longer time. The coating quality and adhesion will then be clearly negatively affected. An optimum has, thus, been found between these values, preferably between 2.0 and 2.7.

A further embodiment is a coating of aluminium oxide. The aluminium oxide has the general formula AlOx wherein x varies from 1.0 to 1.5 time Al, preferably of $Al_2O_3$. Preferably, the thickness of such a coating is from 5 to 300 nm, more preferably from 5 to 100 nm and most preferably from 5 to 50 nm.

Normally, an aluminium metallised layer inherently has a thin surface portion consisting of an aluminium oxide due to the nature of the metallisation coating process used.

A thin coating metallisation layer, or a layer of an inorganic metal compound, is preferably applied by means of vacuum vapour deposition, but may less preferably be applied also by other methods generally known in the art having a lower productivity, such as electroplating or sputtering. The most preferred metal according to the present invention is aluminium, although any other metal capable of being vacuum deposited, electroplated or sputtered may be used according to the invention. Thus, less preferred and less common metals such as Au, Ag, Cr, Zn, Ti or Cu are conceivable also. Generally, thin coatings of metal or a mixture of metal and metal oxide provide barrier properties against water vapour and are used when the desired function is to prevent water vapour from migrating into and through the multilayer film or packaging laminate. Most preferably, the metal in a metallisation or inorganic metal coating is aluminium (Al). Further examples of aluminium inorganic compounds are aluminium oxide, nitride and aluminium carbide, or a mixture of these.

Also other vapour deposited inorganic metal compound layers may be suitable for carrying out the invention. Also similar compounds from half-metals such as silicon may be suitable for the invention and are included by the term inorganic metal compounds, as long as they are cost-efficient and have at least some low level of oxygen barrier properties.

Some of these inorganic coatings may be applied by means of plasma enhanced chemical vapour deposition method (PECVD), wherein metal or metal compound vapour is deposited onto the substrate under more or less oxidising circumstances. Silicon oxide coatings may, for example, be applied by a PECVD process. A suitable PECVD process is for example described in CH697471.

In one embodiment according to the invention, the vapour deposition coating may be a carbon-based barrier layer. Such carbon-based layers may be coated by means of a plasma coating process, resulting in a hydrocarbon polymer coating, often referred to as amorphous carbon or diamond-like carbon (DLC) coatings. Generally such process involves treatment of the surface to which the coating is to be applied with an inert gas plasma, generating a plasma from a hydrocarbon gas and controlling the ions of the gas plasma from the hydrocarbon gas such that they impinge the surface forming an amorphous carbon surface. For a more detailed explanation the exemplifying part of U.S. Pat. No. 4,756,964 is referred to.

The multilayer polymer barrier film can be of any thickness as long as it will provide for a packaging container having good barrier properties and integrity properties in handling and distribution. The choice of substrate film however affects the costs of resulting packaging material and packaging containers to large extent. According to the present invention suitable polyolefins are a biaxially oriented polyolefin selected from the group consisting of polypropylene homopolymers, propylene-ethylene copolymers, propylene copolymers with other alpha-olefins, including propylene-ethylene-butylene ter-polymers and polyethylene homo- and copolymers having a density higher than 0.930, and blends of two or more of said polyolefins.

According to the invention a coated, biaxially oriented film comprising a biaxially oriented polymer barrier film having a vapour deposition coating on the barrier surface layer of EVOH, said coated biaxially oriented film having a thickness of 5-30 μm, such as 7-20 μm, such as 8-15 μm and an oxygen transmission (OTR) lower than 0.1, such as lower than 0.09, such as lower than 0.05 $cm^3/m^2$/1 day/1 atm, 24 h, 23° C., 50% RH is provided. The multilayer polymer barrier film according to the invention will in use as packaging laminates and packaging containers have a heat sealing layer applied to one side (forming the innermost layer of a packaging container), commonly applied by means of extrusion coating when laminating into a packaging laminate. Thus the present invention additionally relates to a laminated packaging material, comprising a bulk layer of paper or paperboard having an outer heat sealable polyolefin layer on one side and the optionally coated biaxially oriented polymer barrier film according to the present invention on its other side, said barrier film having a heat sealable polyolefin layer on the side opposite the bulk layer.

According to one embodiment of the invention, the vapour deposition coated barrier layer is applied onto a substrate polymer film including said innermost heat sealable polymer layer.

The substrate polymer film is a biaxially oriented polyolefin. Preferably, the innermost heat sealable polymer layer is mainly consisting of a low density polyethylene (LDPE), for example a linear low density polyethylene (LLDPE) such as a metallocene catalyst linear low density polyethylene (mLLDPE).

In connection with the incorporation of the film into a packaging laminate, as previously discussed one or more additional heat sealable layers may be applied onto the film, and if present onto the lamination layer of the film. An innermost layer of a heat sealable polyolefin polymer is applied as a layer to be directed towards the inside of the container, and is also intended to be in direct food contact. Preferably, such additional heat seal layers are applied onto the lamination layer of the film. Preferably, the heat sealable layer for the innermost layer is a polyethylene polymer of the lower density type, selected from the group consisting of LDPE, LLDPE or m-LLDPE and blends of two or more thereof. However, depending on the type of packaging containers produced from the packaging material, also heat sealable innermost layers of polypropylene or propylene co- or ter-polymers are conceivable within the scope of the invention.

Furthermore, the packaging laminate may comprise one or more outermost heat sealable polyolefin layer(s) arranged on the opposite side of the bulk layer. Such an outer heat sealable polyolefin layer(s) will directly face the surrounding environment of a resulting packaging container.

The packaging laminate can in one embodiment comprise a bulk layer of paperboard having the barrier film according to the invention on one side and one heat sealable polyolefin layer on the opposite side, i.e. to be the outer side of the filled and sealed resulting packaging container. The side of the bulk layer, e.g. paperboard, which is to be the outer side of the closed and sealed packaging container can contain a print optionally covered by at least the heat sealable polyolefin layer. Applied on the film is a heat sealable polyolefin layer which is to be the inside layer of the filled and sealed packaging container. When the film is used as described on the inside of the packaging container between paperboard and the product, such as liquid food product, it additionally provides a vapour barrier protecting the paperboard from the liquid food. Additionally, detailed descriptions of embodiments of the invention are disclosed in connection with the description of embodiments.

EXAMPLES

Example 1a

A film was produced by cast co-extrusion of polymer layers, comprising a base layer or core layer of polypropylene (Moplen HP 422 H from LyondellBasell), a compatibilising tie layer of maleic anhydride grafted polypropylene (Mitsui AT 1179 E from Mitsui) adjacent a first side of the base layer and an external surface layer of EVOH adjacent said tie layer (EVAL F 171 B, having an ethylene content of 32 mole-%) and a further layer made of a blend of 90 weight-% polypropylene (Moplen HP 422 H) and 10 weight-% of an ethylene propylene plastomer (Versify 3300 from Dow Chemicals) on the second side of the base layer. Adjacent the second side polypropylene layer, a sealing or lamination layer made of a blend of 94 weight-% of medium density polyethylene (Dowlex 2740 G from Dow) and 6 weight-% of an antiblock masterbatch in a terpolymer carrier (AB PP 05 SC from AG Schulman)

The thicknesses of the sheet layers before orientation were:

25 microns of EVOH F171B
55 microns of Mitsui AT 1179 E
340 microns of Moplen HP 422 H
55 micron of Moplen HP 422 H, Versify 3300 blend
34 micron of Dowlex 2740 G, AB PP 05 blend The thus obtained film was thereafter simultaneously stretched in a LISIM tenter frame, 5.5 times its original length in the machine direction (MD) and 7.6 times its original width in the transversal direction (TD), while maintaining the temperature of the film at above 135° C. After stretching, the thickness of the polypropylene (PP) base layer and the second side PP layer was altogether 11.5 μm while the thickness of the oriented EVOH layer was 0.6 μm. The thickness of the tie layer was 1.5 μm.

The oxygen transmission of the resulting oriented film was measured and reported as 4.0 $cm^3/m^2$/day/atm at 23° C. 65% RH.

Example 1b

A further film was produced as described in Example 1a, except that it was simultaneously stretched 6 times its original length in the machine direction (MD) and 7.8 times its original width in the transversal direction (TD), while maintaining the temperature of the film at above 135° C.

After stretching, the thickness of the PP base layer and the second side PP layer was altogether about 9.3 µm while the thickness of the oriented EVOH layer was about 0.6 µm. The thickness of the tie layer was about 1.3 µm.

The oxygen transmission of the resulting oriented film was measured and reported as 2.39 $cm^3/m^2/day/atm$ at 23° C. 50% RH (i.e. 0% relative humidity at the sealing layer side and 50% relative humidity at the side of the EvOH layer).

The oxygen transmission of the resulting oriented film was measured and reported as 20.8 $cm^3/m^2/day/atm$ at 23° C. 90%/90% RH (i.e. 90% relative humidity at both outer sides of the oriented film).

Example 2

A further film was produced as described in Example 1, except that the EVOH employed (EVAL L171B) had an ethylene content of 27 mole-% instead.

The oxygen transmission of the resulting oriented film was measured and reported as 0.6 $cm^3/m^2/day/atm$ at 23° C. 65% RH.

Example 3

A film was produced by cast co-extrusion of polymer layers, comprising a base layer or core layer of polypropylene (Moplen HP 422 H from LyondellBasell), a compatibilising tie layer blend of 50 weight % Bynel CXA50E739 and 50 weight % Admer AT1179E adjacent a first side of the base layer and an external surface layer of EVOH adjacent said tie layer (EVAL F 171 B, having an ethylene content of 27 mole-%) and a further layer made of a blend of 90 weight-% polypropylene (Moplen HP 422 H) and 10 weight-% of an ethylene propylene plastomer (Versify 3300 from Dow Chemicals) on the second side of the base layer. Adjacent the second side polypropylene layer, a sealing or lamination layer made of a blend of 94 weight-% of medium density polyethylene (Dowlex 2740 G from Dow) and 6 weight-% of an antiblock masterbatch in a terpolymer carrier (AB PP 05 SC from AG Schulman)

The thus obtained film was thereafter simultaneously stretched in a LISIM tenter frame, 5.5 times its original length in the machine direction (MD) and 7.6 times its original width in the transversal direction (TD), while maintaining the temperature of the film at above 135° C. After stretching, the thickness of the PP base layer and the second side PP layer was altogether about 9.3 µm while the thickness of the oriented EVOH layer was about 0.6 µm. The thickness of the tie layer was about 1.3 µm.

The oxygen transmission of the resulting oriented film was measured and reported as 0.5 $cm^3/m^2/day/atm$ at 23° C. 50% RH (i.e. 0% relative humidity at the EVOH side and 50% relative humidity at the side of the sealing layer).

The oxygen transmission of the resulting oriented film was measured and reported as 20.5 $cm^3/m^2/day/atm$ at 23° C. 90%/90% RH (i.e. 90% relative humidity at both outer sides of the oriented film).

Example 4

The oriented film according to Example 1b was provided with a metallised coating. The coating was applied to the EVOH layer acting as a receiving layer for the coating. The metallisation conditions used are considered to be typical conditions however example of suitable conditions are:
- line speed: about 300 m/min;
- optical density set point about 2.0;
- aluminium wire speed: about 72 cm/min; and
- plasma power (argon): 3 kW.

The oxygen transmission of the resulting metallised oriented film was measured and reported as 0.04 $cm^3/m^2/day/atm$ at 23° C. 0/50% RH Example 5A further film was produced as described in Example 4, except that the oriented film from Example 3 was metallised.

The oxygen transmission of the resulting metallised oriented film was measured and reported as 0.03 $cm^3/m^2/day/atm$ at 23° C. 0/50% RH Example 6

The oriented film according to Example 1b was provided with an amorphous carbon coating. The coating was applied to the EVOH layer acting as a receiving layer for the coating. The coating was applied by a PTP-500 Labline and the film was pre-treated with Argon. $C_2H_2$ gas at 1 slm (standard liters per minute) was used at a 2 kW power and a pressure of 0.04 mbar. The cooling drum had a temperature of −15° C. and the web tension was about 40 N.

The oxygen transmission of the resulting carbon coated oriented film was measured and reported as about 0.08 $cm^3/m^2/day/atm$ at 23° C. 05/50% RH Example 7

A further film was produced as described in Example 6, except that the oriented film from Example 3 was coated with an amorphous carbon coating.

The oxygen transmission of the resulting carbon coated oriented film was measured and reported as 0.04 $cm^3/m^2/day/atm$ at 23° C. 05/50% RH Examples 8-11

Preparation of Packages

The coated and oriented films according to Examples 4 (metallised coated and oriented film from Example 1b), 5 (metallised coated and oriented film from Example 3), 6 (DLC coated and oriented film from Example 1b), and 7 (DLC coated and oriented film from Example 3) were used to prepare packaging laminates which were formed, filled and sealed to packages of the Tetra Brik® Aseptic (TBA) type in a TBA/8 machine. That is Example 4 was used to prepared the package in Example 8, Example 5 was used to prepare the package in Example 9, Example 6 was used to prepare the package in Example 10, and Example 7 was used to prepare the package in Example 11. The packaging laminate prepared comprised the general structure decor layer/paperboard/adhesive/coated and oriented film/heat sealing layer.

As specific examples LDPE, i.e. 19N730 was used as decor layer, and as adhesive layer. When the coated core layer was a metallised oriented film (Example 8 and 9) an additional adhesive was used between the metallisation and the LDPE. The additional adhesive was an ethylene methacrylic acid copolymer (EMAA), such as those marketed under the tradename Nucrel from Dupont. The heat sealing layer is generally a metallocene catalyst linear low density polyethylene (mLDPE), optionally blended with a LDPE.

Suitable mLDPE are marketed under the tradenames Exceed by ExxonMobile Chemical, Starflex from LyondellBasell, Exact or Elite by The Dow Chemical Company, Borecene from Borealis, Eltex from Ineos. In the examples 8-11 Elite 5800 G (The Dow Chemical Company) was used. The paperboard used was a 320 mN CLC/C paperboard from Frövi. The packaging laminate used in example 8-11 thus were LDPE/paperboard/LDPE/coated and oriented film/LDPE/mLLDPE.

The packaging laminates were then transformed into 1000 ml TBA packages in a TBA/8 machine.

The resulting oxygen transmissions for the packages are presented in Table 3.

Comparative Example 1

A further film was produced as described in Example 1a, except that the EVOH employed had an ethylene content of 48 mole-% (EVAL G156B) and that the biaxial orientation was performed sequentially, i.e. first the film was orientated 5.2 times in the MD and subsequently it was orientated 9 times in the TD.

The oxygen transmission of the resulting oriented film was measured and reported as 110 cm$^3$/m$^2$/day/atm at 23° C. 65% RH.

Comparative Example 2

A further film was produced similar to comparative example 1 except that the base layer or core layer of polypropylene (Moplen HP 525 J from LyondellBasell), the compatibilising tie layer was Admer AT1179E adjacent a first side of the base layer and an external surface layer of EVOH, having an ethylene content of 48 mole-% (Eval G156B from Eval Company) adjacent said tie layer (and a further layer made of polypropylene (Moplen HP 525 J) on the second side of the base layer.

The oxygen transmission of the resulting oriented film was measured and reported as 73 cm$^3$/m$^2$/day/atm at 23° C. 50% RH; and 257 cm$^3$/m$^2$/day/atm at 23° C. 90%/90% RH.

Comparative Example 3A

Further film was produced as described in Example 4, except that the film from Comparative Example 2 was metallised.

The oxygen transmission of the resulting metallised film was measured and reported as 0.08 cm$^3$/m$^2$/day/atm at 23° C. 50% RH Comparative Example 4

A further film was produced as described in Example 6, except that the film from Comparative Example 2 was coated with an amorphous carbon coating.

The oxygen transmission of the resulting carbon coated oriented film was measured and reported as 0.07 cm$^3$/m$^2$/day/atm at 23° C. 50% RH Comparative Examples 5 and 6

Preparation of Packages

Packages were produced as described in Examples 8-11 with the exceptions that Comparative Examples 3 and 4 were used as oriented films respectively. Thus Comparative Example 5 corresponds to using a metallised oriented film.

The results of comparison of the barrier properties between different ethylene contents of the EVOH layer can be seen in Table 1.

The EVOH having 48 mole % of ethylene did not improve its barrier properties upon orientation. The EVOH having 32 mole-% of ethylene shows an OTR 3.5 times lower due to the effect of orientation. The EVOH having 27 mole-% of ethylene shows an OTR 12 times lower than not orientated film.

TABLE 1

*over a 10 μm BOPP layer, the film has been obtained by simultaneous orientation at stretch ratios in the MD and TD being 6 and 7.8, respectively

| Ethylene %**** | Grade | 20 microns not oriented film** OTR | Calculated at 0.6 micron not oriented film*** OTR | Measured on oriented 0.6 microns film* OTR | Improvement factor due to orientation Ratio |
|---|---|---|---|---|---|
| 48 | G156B Comparative Example 1 | 3.2 | 110 | 110 | 1.0 |
| 32 | F171B Example 1a | 0.4 | 14 | 4.0 | 3.5 |
| 32 | F171B Example 1b | 0.4 | 14 | 2.39 | 5.9 |
| 27 | L171B Example 2 | 0.2 | 7 | 0.6 | 12.0 |
| 27 | F171B Example 3 | 0.2 | 7 | 0.7 | 10 |

*cm$^3$/m$^2$/day/atm at 23° C. 50% RH
**data taken from literature at 20° C., 65% RH, (ISO 14663-2)
***extrapolated from values for 20 microns films, calculated based on the following equation $P_T = \dfrac{L_T}{\dfrac{1}{TR_A} + \dfrac{1}{TR_B} + \ldots + \dfrac{1}{TR_N}}$, published as equation 8 in by S. E. Solovyof, Permeability of Multilayer Structures; e-Polymers 2006, no. 023. $L_T$ is total film thickness and $TR_n$ is the transmission rate for each single layer. Based thereon TR can thus be estimated at different thicknesses.
**** Ethylene % referring to ethylene content in EVOH We can thus see that the simultaneously oriented EVOH layers had considerably improved oxygen barrier properties than anything previously reported, already on the HSE-film itself, without any further coating with barrier material. We believe this being an effect of the combination of high ratio and high rate simultaneous orientation, achieved using a simultaneous tenter frame process with EVOH grades having a low ethylene content (lower or equal to 36 mole-%, preferably lower or equal to 32 mole-%), the EVOH being positioned at the film surface while stretching the film.

The barrier and mechanical properties from the films of Examples 1, 2 and 3 are listed in Table 2, and compared with two other films. The properties were obtained in accordance with ASTM D882 of 2009.

The firstly listed comparative film (CF1) BFC19, from Treofan®, is a sequentially biaxially oriented BOPP film coated with a polymer dispersion coating of polyvinylalcohol (PVOH), normally for the purpose of subsequent metallisation. The total thickness of the film is 19.6 μm, and the OTR is measured to 5.5 cm$^3$/m$^2$/day/atm at 23° C. and 50% RH. However, at a raised humidity to 90%/90% RH, the PVOH naturally deteriorates to provide virtually no oxygen barrier at all. Consequently, such a film must be further coated with a barrier material and protected into a laminated structure in order to provide an acceptable and reliable oxygen barrier for chilled or liquid food packaging. Moreover, as previously mentioned, this type of film is not cost-efficient with regard to the two coating operations.

The second comparative film (CF2, comparative example 2) is a biaxially oriented HSE film, obtained by sequential tenter frame orientation, from a base layer of polypropylene and a high surface energy layer of EVOH, described in the above summarised patent U.S. Pat. No. 5,153,074, with a film thickness of 18.4 and a measured OTR value of about 73 cm$^3$/m$^2$/day/atm at 23° C. and 50% RH, which increases to 257 at 90%/90% RH. As explained earlier, such a film does not have sufficient oxygen barrier properties, since the EVOH grades suitable for sequential orientation have a higher ethylene content and therefore also initially lower barrier properties. If oxygen barrier properties were to be provided by the HSE-film itself in this type of film, a considerably thicker layer of EVOH would be needed and thereby the total films cost increase.

The oxygen transmissions for packages were tested on a Mocon Oxtran 1000 at 50% (ambient humidity).

The methods for determining OTR identifies the amount of oxygen per surface and time unit at a passing through a material at defined temperature, given atmospheric pressure, and chosen driving force.

Water vapour transmission rate (WVTR) measurements were carried out by a Lyssy instrument (norm: ASTM F1249-01 using a modulated Infrared sensor for relative humidity detection and WVTR measurement) at 38° C. and 90% driving force. This test method is dedicated to measure Water Vapor Transmission Rate (WVTR) properties of films. The procedure is done according to ASTM F1249-01 using a modulated Infrared sensor for relative humidity detection and WVTR measurement.

This test method identifies the amount of water vapour per surface and time unit passing through a material at defined

TABLE 2

|  |  | CF1 19 um*<br>BoPP-<br>PVOH | CF2 18 um**<br>BoPP-<br>EVOH | Example 1a<br>BoPP-<br>EVOH32- | Example 1b<br>BoPP-<br>EVOH32- | Example 2<br>BoPP-<br>EVOH27- | Example 3<br>BoPP-<br>EVOH27- |
|---|---|---|---|---|---|---|---|
| Overall film thickness (um) | Average TD | 19.6 | 18.4 | 11.6 | 12 | 11.9 | 12 |
| E modulus (MPa) | Average MD | 2306 | 2547 | 2616 | 2720 | 2720 | 2404 |
|  | Average TD | 4496 | 4713 | 3041 | 3032 | 3032 | 2775 |
| Strength at break (MPa) | Average MD | 147 | 147 | 192 | 187 | 187 | 174 |
|  | Average TD | 269 | 217 | 239 | 232 | 232 | 232 |
| Elongation at break (%) | Average MD | 161 | 198 | 73 | 69 | 69 | 83 |
|  | Average TD | 41 | 41 | 55 | 53 | 53 | 63 |
| WVTR (g/m2*day) | 38° C./90% RH | 6.5 ± 0.7 | ND** | 13.7 ± 2.8 | ND** | 10.2 ± 1.9 | ND** |
| OTR (cm3/(m2 · 1 atm · day) | RH = 65% | 5.5 ± 0.13 | 68.7 ± 11.1 | 4.0 ± 0.8 | 2.39 ± 0.1* | 0.6 ± 0.1 | 0.5 ± 0.1* |
|  | RH = 90%/90% | >1000 | 257.0 ± 14.1 | 9.4 ± 0.0 | 20.8 ± 14 | 20.5 ± 0.9 | 20.5 ± 0.9 |

*cm$^3$/m$^2$/day/atm at 23° C. 50% RH
**ND means not determined.

TABLE 3

|  | Type of coating | OTR package (cc/package*0.21 atm *24 h)<br>(Tetra Brik Aseptic standard 1 l volume) |
|---|---|---|
| Example 8 | Metallisation | 0.0143 |
| Example 9 | Metallisation | 0.0123 |
| Example 10 | DLC | 0.0207 |
| Example 11 | DLC | 0.018 |
| Comparative Example 5 | Metallisation | 0.049 |
| Comparative Example 6 | DLC | 0.061 |

Table 3 discloses OTR values obtained for standard Tetra Brik® Aseptic of 1 liter volume. The packages were obtained by a TBA/8 filling machine in order to obtain comparative oxygen transmission results comparing packages prepared using the biaxially oriented polyolefin film of the invention having a EVOH surface barrier layer with a EVOH content below 36 mole-% and the polyolefin films having a EVOH surface barrier layer with a EVOH content at about 48 mole-%. As can be seen in Table 3 the packages prepared with the polyolefin film of the invention has an improved oxygen transmission rate. A high EVOH content result in packaging laminate that is more brittle. Upon forming a package, for example by the form-fill-seal technology, it seems that the film is compromised, possibly by the forming of cracks in the coating, leading to parts of the package having compromised integrity resulting in higher oxygen transmission rates.

The oxygen transmission was tested in a Mocon 2/20 at 20% oxygen and corrected by a factor 5, to 100% oxygen (for the oriented films and coated and oriented films).

temperature and driving force (relative humidity difference on the two sides of the sample). The SI units used to express the Water Vapor Transmission Rate (WVTR) are [g/m2.day].

For this purpose, the sample is sealed in the middle of a 2 parts tight cell (one humidified part and one dried part). After conditioning, the increasing humidity level in the dry part due to the water molecules going through the material is measured in several cycles by means of a modulated infrared humidity sensor and recalculated as transmission rate.

As can be seen in Table 3 the OTR of the packages are improved using the present invention.

DESCRIPTION OF THE DRAWINGS

Further advantages and favorable characterising features of the present invention will be apparent from the following detailed description, with reference to the appended figures, in which.

DESCRIPTION OF EMBODIMENTS

Figure 1A:
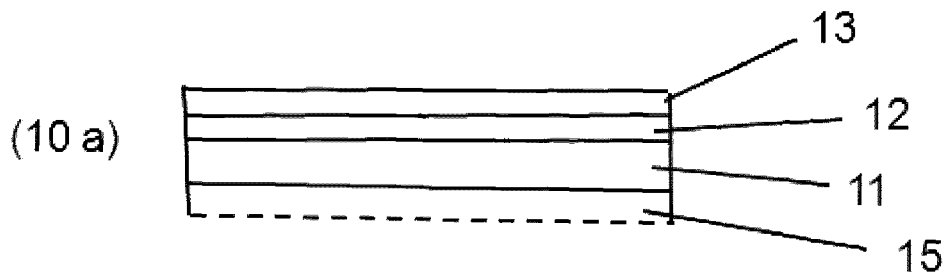
FIG. 1a is a cross-sectional view of a preferred biaxially oriented, barrier polymer film according to the present invention.

FIG. 1a shows a cross-section of a preferred biaxially oriented polymer barrier film 10a according to the invention. The base or core layer 11 of the oriented film is a polypropylene homo-polymer, which is laminated to an external, high-surface energy, flexible barrier layer of EVOH 13, by means of a tie layer 12 of a maleic anhydride-grafted polypropylene polymer. The film optionally further comprises a lamination layer 15 on the side of the film which is opposite to the EVOH barrier layer 13. The lamination consists of a heat sealable polyolefin composition comprising a medium density polyethylene having a density of above 0.930. Between the layers there is adequate adhesion and integrity, which have been maintained throughout a simultaneous biaxial orientation process. The thickness of the polypropylene base layer is from 8 to 12, preferably 10, μm and the thickness of the tie layer 12 is about 1.5 μm. The thickness of the EVOH barrier layer is about 0.6 μm. The thickness of the optional lamination or heat sealable layer is about 0.6 μm. The EVOH has an ethylene content of 32 mole-% or lower, preferably 27 mole-% or lower.

Figure 1B:
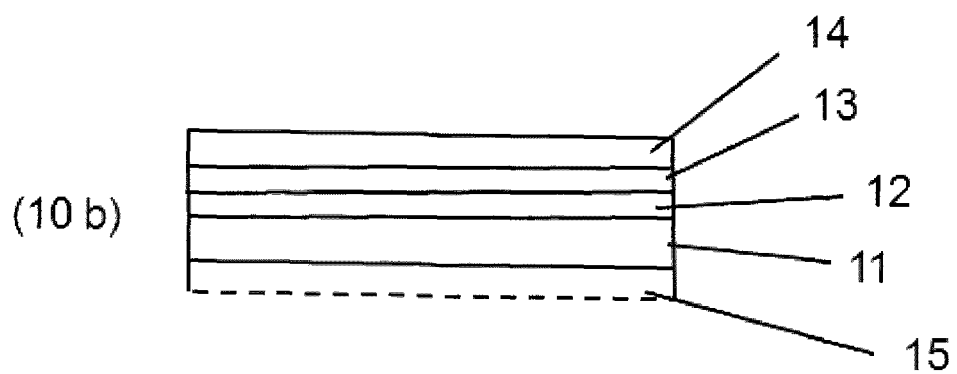
FIG. 1b is a cross-sectional view of a vapour deposition coated barrier polymer film according to the present invention.

FIG. 1b shows a cross.-section of a preferred barrier-coated, biaxially oriented polymer barrier film 10b, according to the invention. The film comprises the film 10a as described in FIG. 1a, which has been vapour deposition coated with a further gas barrier layer 14 onto the high-surface energy layer 13. The vapour deposition layer preferably is a diamond-like carbon coating, SiOx (silicon oxide based coating) or AlOx (aluminium oxide based coating) layer or a metallised layer, applied at a thickness of about 200 nm.

Figure 2:
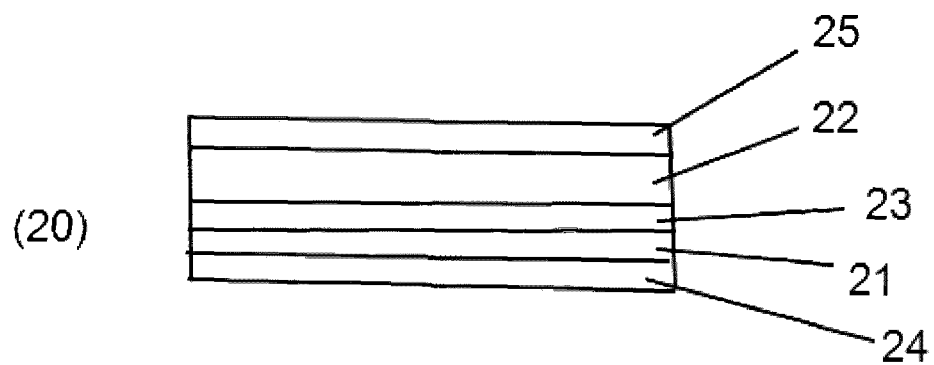
FIG. 2 is a cross-sectional view of a laminated packaging material according to the present invention, including a high-surface energy barrier polymer film according to the invention, as described in connection with FIG. 1b.

FIG. 2 shows a cross-section of a preferred packaging laminate according to the invention. The barrier film 10b;21 is laminated to a paperboard layer 22 by an intermediate bonding layer of a low density polyethylene 23, which has been applied by means of an extrusion lamination process involving the paperboard 22, the barrier film 21 and an extruded melt layer of polyethylene. Other bonding layers are of course also feasible within the scope of the invention, in particular modified or grafted polyethylene-based polymers. On each outer side of the thus obtained laminated product, a heat-sealable polyethylene-based layer is applied by means of extrusion coating. The outer layer to be directed towards the inside of a package produced from the packaging laminate, i.e. the innermost layer 24, comprises a low density type of polyethylene of the metallocene-catalysed or single site type (m-LLDPE), in order to provide a robust heat sealing operation and a strong seal of a sealed packaging container.

The thickest layer in the laminate is a bulk paper or paperboard layer 22. Any paper or paperboard suitable for liquid carton-based packaging may be employed for the bulk layer 22. It should be noted that the laminate layers in FIG. 2 do not reflect the fact that the thickness of the barrier film 21 is significantly thinner than the paper core layer 22.

On the outside of the paper or paperboard layer 22, which will constitute the outside of a packaging container produced from the packaging laminate, is applied an outermost layer 25 of a heat-sealable polyolefin, preferably a low density polyethylene (LDPE) or a linear low density polyethylene (LLDPE), which may include also so-called metallocene-catalysed LLDPE's (m-LLDPE), i.e. LLDPE polymers catalysed by means of a single site catalyst.

Figure 3:
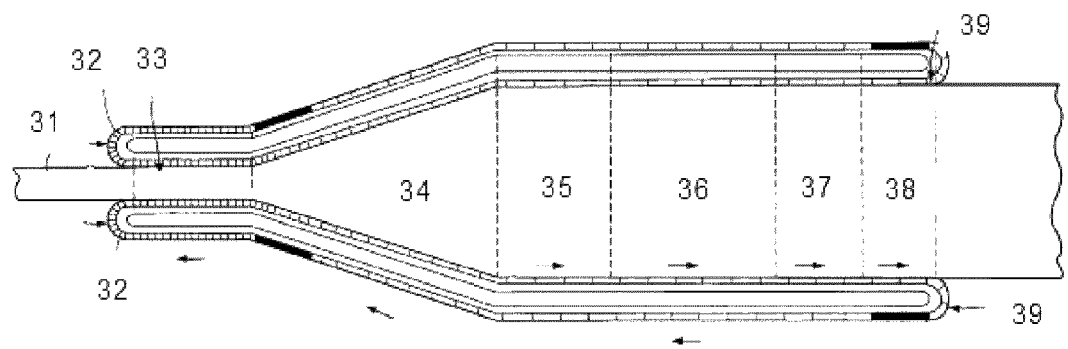
FIG. 3 is a diagrammatic view of a plant for simultaneous stretching of the barrier film of the invention.

FIG. 3 is a diagrammatic view of a preferred plant for simultaneous stretching of the film of the invention. Such a plant is well known in the art and for example marketed under the trade name LISIM® by Brückner GmbH. It is operated by a linear-motor-driven tenter frame equipment 30, in which linear-motor-driven tenter-clip carriages are advanced on a circulating track and may be driven and controlled by speed, enabling a highly flexible stretching operation, which is easy to control. Two tenter-clip circulating tracks 32 are guiding tenter-clip carriages (not shown), which circulate in the direction of the arrows and which carry tenter-clips, which are used for gripping and transporting a film of plastic 31. The film of plastic, usually coming from a slot die via a chill roll, is fed on the input side of the transport installation to a running-in zone 33, where the film of plastic 31 is gripped by the tenter-clips and a pre-warming takes place. After the running-in zone 33, the film of plastic 31 is stretched simultaneously in the longitudinal and transverse directions in a stretching zone 34. Thereafter, the film of plastic 31 is kept at the same temperature for a certain dwell time in a so-called buffer zone 35, then to be heat-set for a brief time at a relatively high temperature in a heat-setting zone 36. In the following relaxation zone 37, the film of plastic 31 can then relax slightly in both axes. This is achieved by a slightly converging rail position of the tenter-clip circulating tracks 32, the distance between the tenter-clips at the same time being reduced. Thereafter, the film 31 is cooled in a cooling zone 38 in a cold air stream. At the running-out end 39, the stretched film of plastic 31 is then released by the tenter-clips and taken over by rolls for any further process. Coming from the running-in zone 33, the advancement and acceleration of the tenter-clip carriages takes place by means of linear motors in the zones 34 to 38 mentioned above. The principle of the linear-motor driven simultaneous orientation method is thus described above, and may be combined with various mechanical and controlling arrangements to ensure smooth driving, transporting and braking of the tenter-clip carriages and thereby to ensure smooth running and tailor-made controlling of the simultaneous stretching speed as well as of the stretching ratio of the stretched film of plastic.

Figure 4:
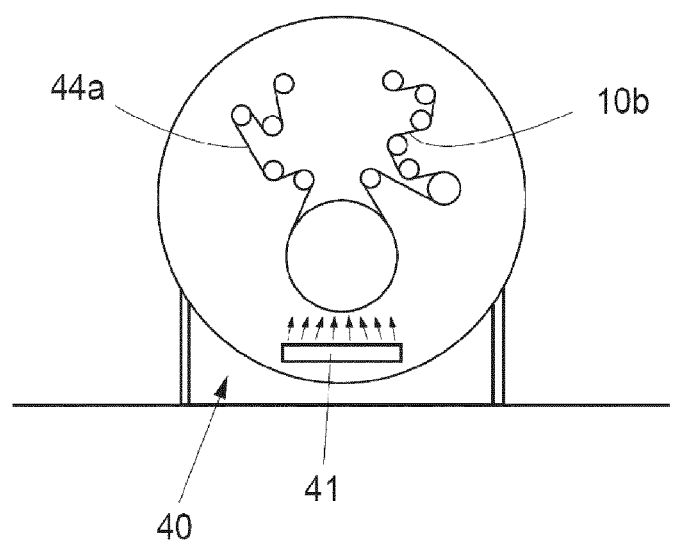
FIG. 4 is a diagrammatic view of a plant for metal or metal oxide coating of the polymer substrate film produced in FIG. 1b.

FIG. 4 is a diagrammatic view of an example of a plant for vapour deposition coating of the polymer film produced in FIG. 1a. The orientated film from FIG. 1a is subjected, on the coating receiving side, to continuous evaporation deposition 40, of a metallised layer of aluminium, possibly in a mixture with aluminium oxide, and the coating is given a thickness of 5-100 nm, preferably 5-50 nm, so that the coated film 10a of the invention is formed. The aluminium vapour comes from a solid piece evaporation source 41.

Figure 5A:
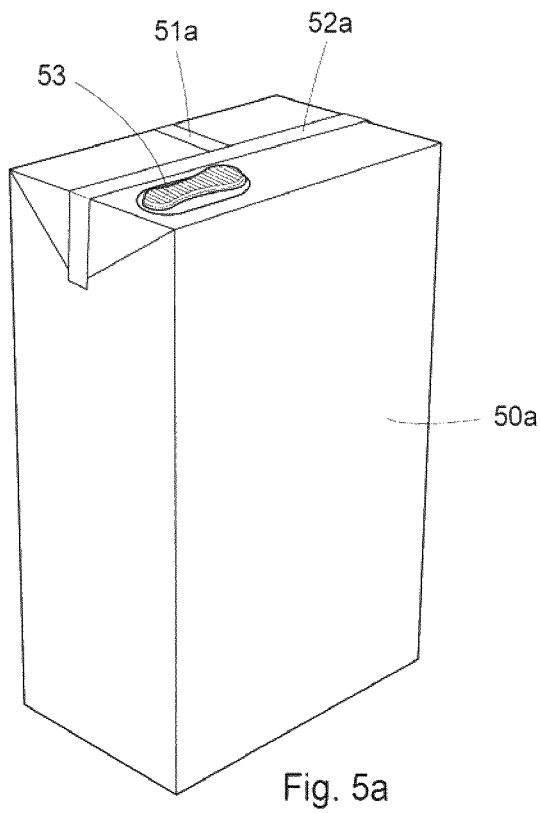
FIG. 5a shows an example of a packaging container produced from the packaging laminate according to the invention.

FIG. 5a shows a preferred example of a packaging container 50 produced from the packaging laminate 20 according to the invention. The packaging container is particularly suitable for beverages, sauces, soups or the like. Typically, such a package has a volume of about 100 to 1000 ml. It may be of any configuration, but is for example brick-shaped, having longitudinal and transversal seals 51 and 52, respectively, and optionally an opening device 53. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still is easy to handle and dimensionally stable when put on a shelf in the food store or on a table or the like.

Figure 5B:
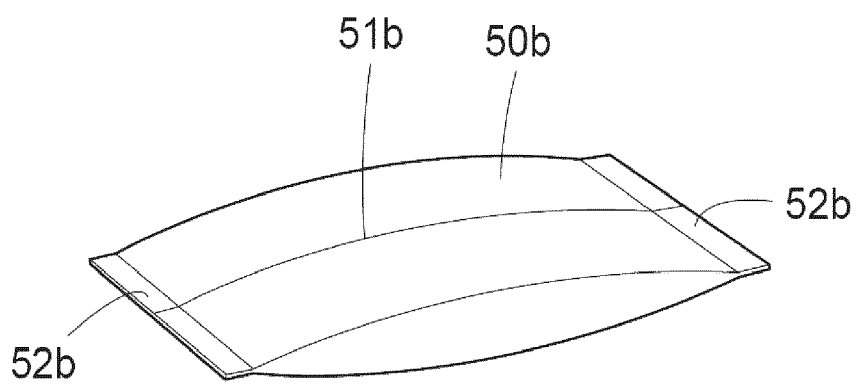
FIG. 5b shows a second example of a packaging container produced from the packaging laminate according to the invention.

FIG. 5b shows an alternative example of a packaging container 50b produced from the packaging laminate 10b according to the invention. Since the packaging laminate 20b may alternatively be thinner by having a thinner core layer, it will not be dimensionally stable enough to form a parallellepipedic or wedge-shaped packaging container, and is not fold formed after transversal sealing 52b. It will thus remain a pillow-shaped pouch-like container and distributed and sold in this shape.

Figure 6:
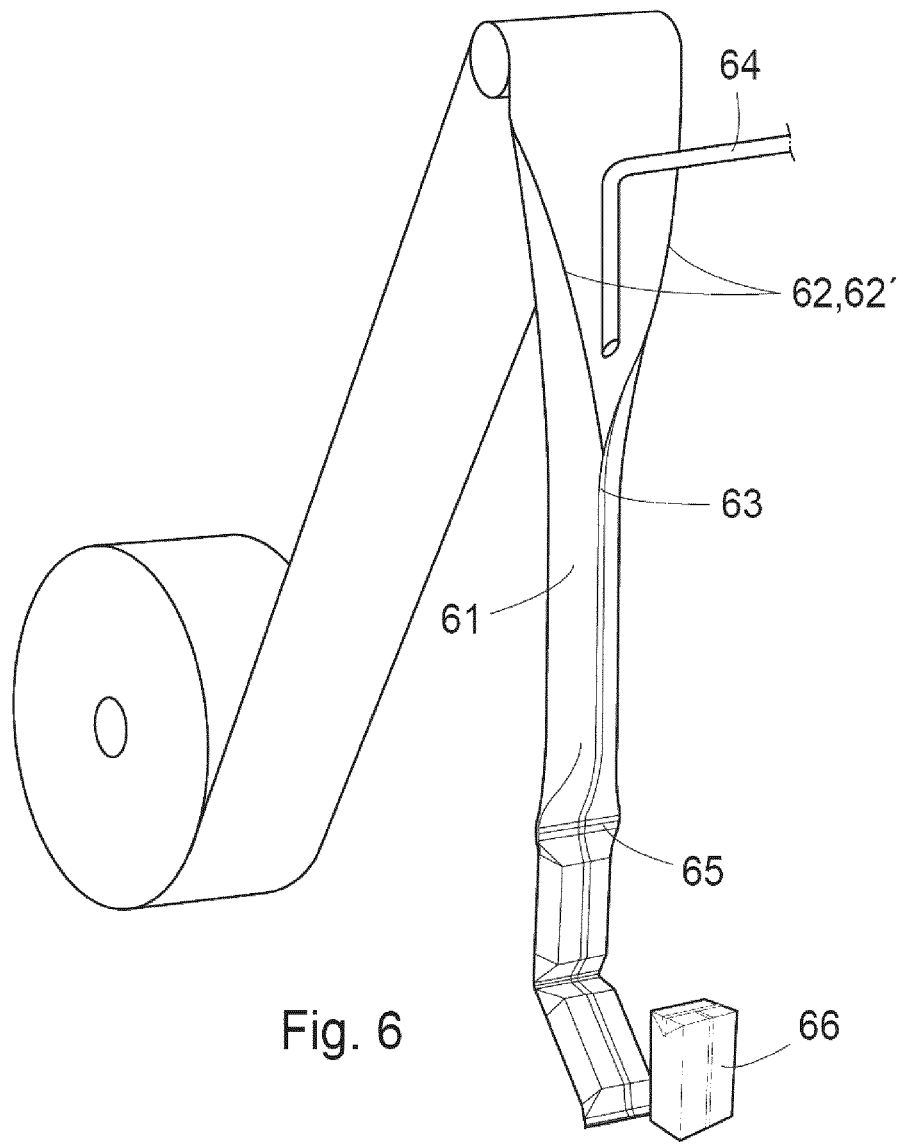
FIG. 6 shows the principle of how such packaging containers are manufactured from the packaging laminate in a continuous forming, filling and sealing process.

FIG. 6 shows the principle as described in the introduction of the present application, i.e. a web of packaging material is formed into a tube 61 by the longitudinal edges 62, 62' of the web being united to one another in an overlap heat sealed joint 63. The tube is filled 64 with the intended liquid food product and is divided into individual packages by repeated transversal seals 65 of the tube at a pre-determined distance from one another below the level of the filled contents in the tube. The packages 66 are separated by incisions in the transversal seals and are given the desired geometric configuration by fold formation along prepared crease lines in the material.

By way of conclusion it should be observed that the present invention which has been described above with particular reference to the accompanying drawings, is not restricted to these embodiments described and shown exclusively by way of example, and that modifications and alterations obvious to a person skilled in the art are possible without departing from the inventive concept as disclosed in the appended claims.

The invention claimed is:

1. A biaxially oriented, multilayer polymer barrier film, having gas barrier properties, and comprising:
   a polyolefin core layer; and
   at least one barrier surface layer of ethylene vinyl alcohol (EVOH) on at least one side of the core layer,
   wherein the barrier layer of EVOH forms an external surface of the multilayer polymer barrier film, is less than 1.5 μm thick, and has an ethylene content of 36 mole-% or lower, wherein the biaxially oriented polymer barrier film has an oxygen transmission (OTR) lower than 10 $cm^3/m^2$/1 day/1 atm, 24 h, 23° C., 50% RH.

2. The biaxially oriented polymer barrier film according to claim 1, wherein the biaxially oriented polymer barrier film has an oxygen transmission (OTR) lower than 5 $cm^3/m^2$/1 day/1 atm, 24 h, 23° C., 50% RH.

3. The biaxially oriented polymer barrier film according to claim 1, wherein the biaxially oriented polymer barrier film has an oxygen transmission (OTR) lower than 1 $cm^3/m^2$/1 day/1 atm, 24 h, 23° C., 50% RH.

4. The biaxially oriented polymer barrier film according to claim 1, wherein the biaxially oriented polymer barrier film has an oxygen transmission (OTR) at high humidity lower than 25 $cm^3/m^2$/1 day/1 atm, 24 h, 23° C., 90% RH.

5. The biaxially oriented polymer barrier film according to claim 1, wherein the biaxially oriented, polymer barrier film is oriented at a stretching ratio of higher than 4 in an axial direction and at a stretching ratio of higher than 4 in a transversal direction.

6. The biaxially oriented polymer barrier film according to claim 1, wherein the core layer comprises a biaxially oriented polyolefin selected from the group consisting of polypropylene homopolymers, propylene-ethylene copolymers, propylene copolymers with other alpha-olefins, including propylene-ethylene-butylene ter-polymers and polyethylene homo- and copolymers having a density higher than 0.930, and blends of two or more of said polyolefins.

7. The biaxially oriented polymer barrier film according to claim 1, wherein the thickness of the EVOH barrier surface layer is from 0.4 to 1.0 μm.

8. The biaxially oriented polymer barrier film according to claim 1, wherein the ethylene content of the EVOH barrier layer is 32 mole-% or lower.

9. The biaxially oriented polymer barrier film according to claim 1, wherein the biaxially oriented polymer barrier film is oriented to a ratio of from 5 to 8 in a machine direction and to a ratio of from 5 to 8 in a transversal direction.

10. The biaxially oriented polymer barrier film according to claim 1, wherein the biaxially oriented polymer barrier film has at least one barrier surface layer of EVOH on each side of the core layer.

11. The biaxially oriented polymer barrier film according to claim 1, wherein the biaxially oriented polymer barrier film has one barrier surface layer of EVOH on one side of the core layer only.

12. The biaxially oriented polymer barrier film according to claim 1, wherein the biaxially oriented polymer barrier film further comprises a biaxially oriented tie layer of a modified polyolefin between the core layer and the EVOH barrier surface layer.

13. The biaxially oriented polymer barrier film according to claim 12, wherein the tie layer is selected from maleic anhydride grafted polypropylene or polyethylene, modified ethylene vinyl acetate polymers or blends thereof.

14. A coated, biaxially oriented film comprising:
   the biaxially oriented polymer barrier film according to claim 1; and
   a deposition coating on the barrier surface layer of EVOH, wherein said coated, biaxially oriented film has a thickness of 5-30 μm, and an oxygen transmission (OTR) lower than 0.1 $cm^3/m^2$/1 day/1 atm, 24 h, 23° C., 50% RH.

15. The coated, biaxially oriented film according to claim 14, wherein said deposition coating is selected from the group consisting of physical vapour deposition (PVD) coating and chemical vapour deposition (CVD) coating.

16. The coated, biaxially oriented film according to claim 14, wherein said deposition coating is a metallisation, a silicon oxide coating or an amorphous carbon coating (DLC).

17. A laminated packaging material, comprising a bulk layer of paper or paperboard having an outer heat sealable polyolefin layer on one side and the biaxially oriented polymer barrier film according to claim 1 on the side opposite to the outer heat sealable polyolefin layer, and said biaxially oriented polymer barrier film having a heat sealable polyolefin layer on the side opposite the bulk layer.

18. The laminated packaging material according to claim 17, wherein having an adhesive layer between the bulk layer of paper or paperboard and the barrier film.

19. A packaging container formed by folding a laminated packaging material according to claim 17.

20. The packaging container according to claim 19, wherein said barrier film has the heat sealable polyolefin layer, forming the inside layer of the packaging container, on the side opposite the bulk layer.

21. The packaging container according to claim 19, wherein an oxygen permeation rate for the container is below 0.1 cc/package*0.21 atm*24 h.

22. A method for manufacturing a biaxially oriented, multilayer polymer barrier film, having gas barrier properties, which method comprises the steps of:
   a) co-extruding a polyolefin core layer together with a surface barrier layer of ethylene vinyl alcohol (EVOH) on a first side of the core layer, to form an external surface of the multilayer polymer barrier film, the surface barrier layer having an ethylene content of at most 36 mole-%, and
   b) simultaneously, biaxially orienting the obtained co-extruded film, while maintaining the temperature of the film during a stretching operation between a minimum level and a melt temperature of the polyolefin of the core layer, which minimum level is depending on the material of the polyolefin core layer of the film and is at least 105° Celsius.

23. The method according to claim 22, wherein a modified polyolefin tie layer is coextruded together with and between the polyolefin core layer and the EVOH barrier surface layer.

24. The method according to claim 22, wherein the polyolefin core layer comprises mainly a polypropylene homo- or copolymer and that the temperature of the film during the stretching operation is from 135° C. to below 165° C.

25. A method according to claim 22, wherein the polyolefin core layer comprises mainly a homo- or copolymer having a density higher than 0.930 and that the temperature of the film during the stretching operation is from 105° C. to below 135° C.

26. The method according to claim 22, wherein the stretching ratio of the simultaneously, biaxially orienting is higher than 4 in an axially direction (MD) and is higher than 4 in the transversal direction (TD).

27. The method according to claim 26, wherein the stretching ratio is from 5 to 8 in the machine direction (MD) and from 5 to 8 in the transversal direction (TD).

28. The method according to claim 22, further comprising the step of:
   c) coating the EVOH barrier surface layer with a further barrier coating.

29. The method according to claim 28, wherein the further barrier coating is a deposition coating.

30. The method according to claim 29, wherein said deposition coating is a metallisation, a silicon oxide coating or an amorphous carbon coating.

31. A laminated packaging material, comprising a bulk layer of paper or paperboard having an outer heat sealable polyolefin layer on one side and the coated, biaxially oriented polymer barrier film according to claim 14 on the side opposite to the outer heat sealable polyolefin layer, and said coated, biaxially oriented polymer barrier film having a heat sealable polyolefin layer on the side opposite the bulk layer.

* * * * *